March 31, 1925.
F. N. SPELLER
1,531,993
WATER TREATING COMPOUND
Filed Feb. 23, 1923
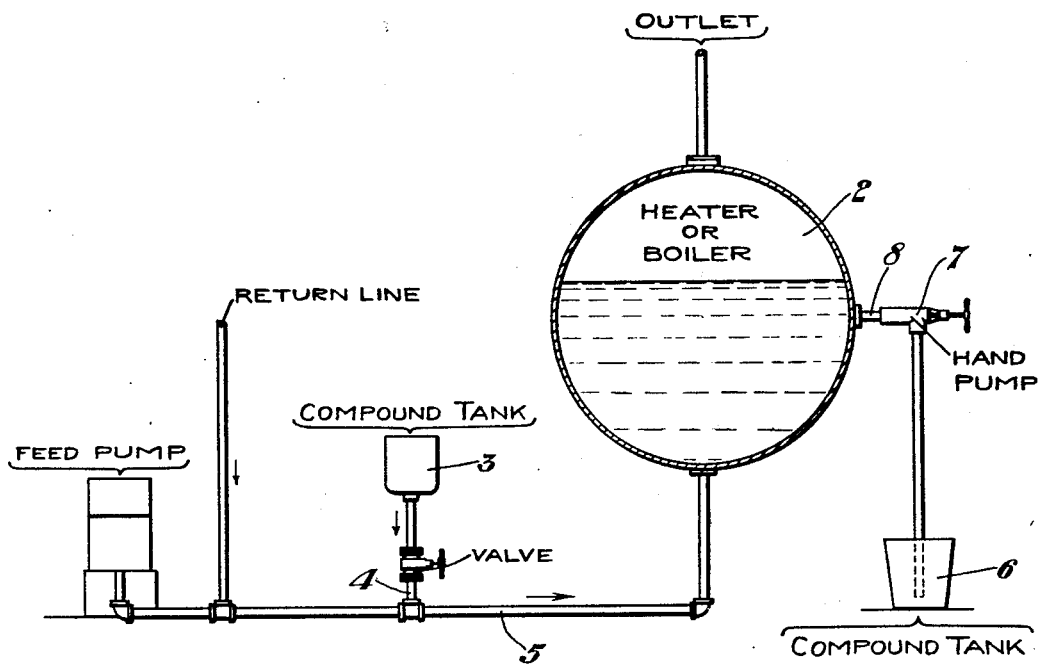
Witnesses:
Edwin Trueb
Inventor:
FRANK N. SPELLER,
by: D. Anthony Usina
his Attorney.

Patented Mar. 31, 1925.

1,531,993

UNITED STATES PATENT OFFICE.

FRANK N. SPELLER, OF PITTSBURGH, PENNSYLVANIA.

WATER-TREATING COMPOUND.

Application filed February 23, 1923. Serial No. 620,707.

*To all whom it may concern:*

Be it known that I, FRANK N. SPELLER, a citizen of the United States, and resident of Pittsburgh, in the county of Allegheny and State of Pennsylvania, have invented certain new and useful Improvements in Water-Treating Compounds, of which the following is a specification.

This invention relates to the treating of water and more particularly to a compound for treating water for use in boilers and the like to absorb the free oxygen, neutralize any acidity, precipitate scale, and form a protective coating on any metal with which the water contacts.

One object of this invention is to provide a compound of this character that may be made up and handled commercially without any appreciable deterioration.

Another object of this invention is to provide a compound of this class that may be readily applied to the water supplied to, boilers, water heaters, etc., without the installation of expensive additional equipment.

Another object of this invention is to provide a compound forming a reagent for addition to water in a heating boiler which will fix the $CO_2$ and free oxygen gas and thus prevent these gases being carried over with the steam and corroding the return pipes and radiator connections of the heating system.

In the drawing, the figure shows two methods of supplying the compound to a boiler or water heater.

The compound of this invention is composed of sodium silicate and sodium sulphite. A concentrated solution of sodium silicate is mixed with a concentrated solution of sodium sulphite, and the compound so formed is added to the boiler or water heater 2 either from the tank 3 through the pipe 4 to the feed water line 5, or directly to the boiler from the tank 6 by means of pump 7 and pipe 8.

It will be understood that either of the above tanks may be used alone or both may be used, as desired. Ordinarily, however, only one source of supply will be necessary.

The use of the above ingredients individually for treating water, has been suggested heretofore, but due to the fact that sodium sulphite, either in solid state or in water solution, deteriorates very rapidly when exposed to the atmosphere and forms sodium sulfate, no practical way has heretofore been discovered or suggested to use it commercially.

I have discovered that by combining a concentrated solution of sodium silicate with a concentrated solution of sodium sulphite, preferably in substantially equal parts, that the sodium silicate will protect the sodium sulphite and prevent the deterioration thereof for a considerable length of time, since the oxygen of the atmosphere penetrates into the sodium silicate solution very slowly. The strength of the above solutions may vary, but I have found by experience that the best results may be obtained by combining a solution of sodium silicate having approximately 150 gm. of sodium silicate per liter of water with an equal part of a solution of sodium sulphite having approximately 150 gm. of sodium sulphite per liter of water.

As stated above, the sodium silicate serves to protect the sodium sulphite from the free oxygen of the atmosphere, and, therefore, it is preferable to have the solutions in concentrated form so as to bring the ingredients into closer contact and also form a denser solution into which the oxygen will penetrate very slowly.

A combined concentrated solution of the above ingredients will absorb the free oxygen from the water, neutralize any acidity, precipitate scale, and form a protective coating on the inside of the pipes, boilers, or other metal parts with which the water comes in contact.

I claim:—

1. A compound for deoxidizing and neutralizing boiler water and forming a protective coating on any metal with which the water contacts, consisting of a solution of sodium silicate and sodium sulphite.

2. A compound for deoxidizing and neutralizing boiler water and forming a protective coating on any metal with which the water contacts, consisting of a concentrated solution of sodium silicate combined with an equal part of a concentrated solution of sodium sulphite.

3. A compound for deoxidizing and neutralizing boiler water and forming a protective coating on any metal with which the water contacts, consisting of a concentrated solution of approximately 150 gm. per liter of sodium silicate combined with an equal part of a concentrated solution of approximately 150 gm. per liter of sodium sulphite.

In testimony whereof I have hereunto signed my name.

FRANK N. SPELLER.